July 29, 1952 E. F. FISCHER 2,605,352
DEFORMABLE MEDIUM FOR CONTROLLING A LIGHT STREAM
Filed Dec. 23, 1947
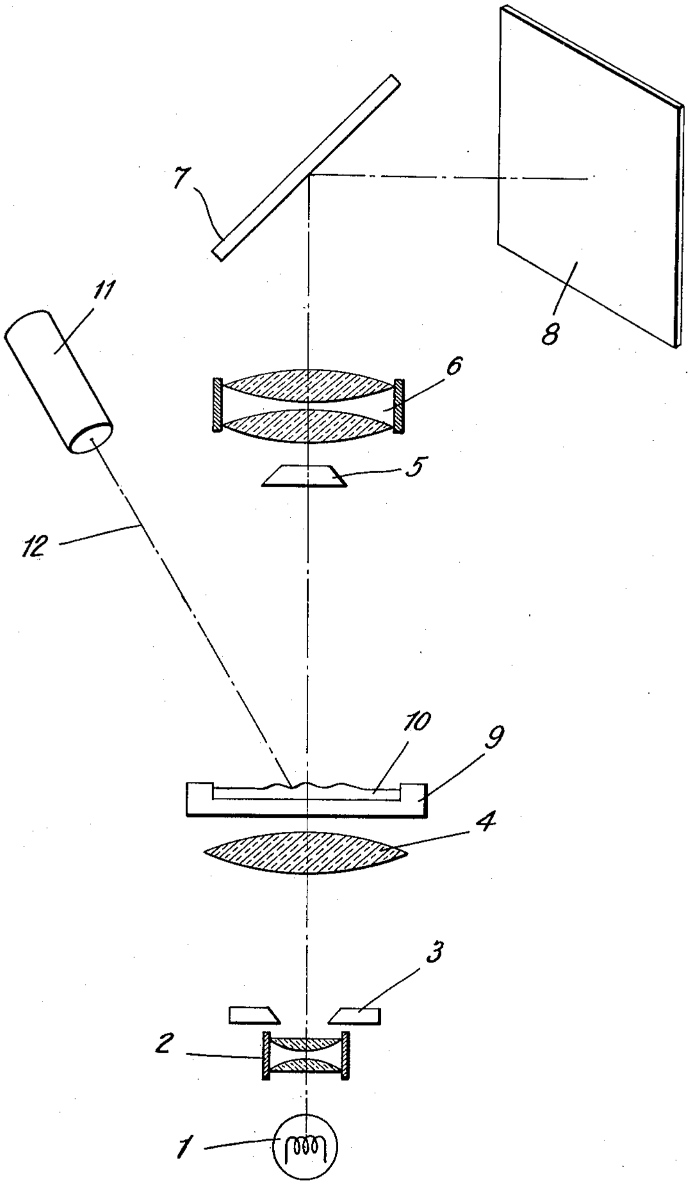
Inventor
E. F. Fischer
By [signature]
Attorneys Patented July 29, 1952

2,605,352

UNITED STATES PATENT OFFICE 2,605,352

DEFORMABLE MEDIUM FOR CONTROLLING A LIGHT STREAM

Ernst Friedrich Fischer, Zurich, Switzerland

Application December 23, 1947, Serial No. 793,369
In Switzerland August 28, 1940

2 Claims. (Cl. 178—7.5)

This invention relates to a television apparatus and more especially to the flatly extended medium used therein to be deformed by the electron beam for controlling the light stream.

An arrangement of the optical parts of such apparatus is represented in the accompanying drawing, in which 1 represents a light source, the light rays of which are projected on to the condenser lenses 2 and then through the diaphragm or gap 3 on to a converging lens 4. The converging lens portrays the gap 3 on a bar 5. An objective 6 and a mirror 7 for projecting the light on to the projection screen 8 are arranged in the further path of the ray and the formable medium 10 is arranged in a trough or container 9 between the converging lens 4 and the bar 5. The deformation of the medium 10 takes place by an electron beam which, by suitable control, accumulates charges on the surface of the medium. This type of deformation is indicated in the example shown in the drawing, in which 11 indicates the source of electrons and 12 the cathode ray effecting the deformation.

The above arrangement is so contrived that when the medium 10 is not deformed, no light falls on the projection screen as the diaphragm 3 is portrayed by the lens 4 on the bar 5. Consequently, the projection screen remains dark. Now, as soon as a deformation of the medium 10 occurs the light rays are deflected, i. e., they are led alongside the bar 5 and thus light reaches the projection screen.

If a television picture is to be produced on the projection screen, the procedure is such that there is produced on the medium by a carrier-frequency modulated electron beam, a charge distribution which deforms the medium into numerous lenses, disposed adjacent to one another. The carrier frequency, recording speed and size of lens have a definite ratio, since lens size (distance from point to point) multiplied by carrier frequency gives the recording speed. By carrier frequency modulated electron beam is understood an electron beam in which the carrier frequency is superimposed on the deflection velocity and the superimposed frequency can be either a velocity modulation or an intensity modulation.

In such an arrangement, the liquid should have certain characteristics, since although a small deformation could certainly be produced by electrical auxiliary means, this deformation would immediately be dissolved again; moreover, the entire surface would be set in motion and thus a controllable regulation of the light stream would be impossible. Consequently, the medium is required to permit small enforced deformations, but no variation in the total surface due to these enforced deformations.

In addition, the deformation must be maintainable for a definite time so that the control or regulation of the light stream is in general possible for a certain length of time. For example, if it is a question of producing on the projection screen a television picture by suitable control of the cathode ray and thus suitable charge distribution on the medium, it is clear that in addition to the requirement that the deformation should remain for a certain time, this deformation must also completely disappear in a determinable time in order to be able to record a fresh picture on the medium. In this, it is not a question of the removal of the applied charge, for this can, as is known, take place, for example, by conductivity of the medium, but of the medium being in the position of maintaining the deformation, and, after a certain time, to cause it completely to disappear.

The above-described arrangement is, in general, similar to that disclosed in my Patent No. 2,391,451, dated December 25, 1945.

The object of the present invention is to provide a deformable liquid medium which fulfills the above-mentioned requirements.

According to the invention, this is attained by the medium consisting of a liquid offering resistance to the disappearance of the deformation enforced by the charge which is applied, the said liquid having the characteristic values and satisfying the equations referred to hereinafter.

A pure liquid having a high internal friction may, in accordance with the invention, be used, or there can be used a viscous liquid enclosed in cell walls, as for example occurs in nature in the form of a colloid.

It has now been shown that usable products for the various liquids can only be used within quite definite temperature limits and that, outside this temperature range, the behaviour of the liquid changes.

According to the invention, therefore, the liquid is kept artifically within a temperature interval. Furthermore, it has been shown that a liquid which completely meets the requirements such as have been fully set out must obey quite definite laws, especially when it is a question of recording on the surface of the medium a charge corresponding to a television picture, which charge must then, according to the picture frequency, disappear completely after the projection.

The characteristic values referred to above are as follows:

Electrical conductivity (K)
Dielectric constant ($\delta$)
Capillarity constant ($\alpha$)
Viscosity ($k$)
Recording speed of the cathode ray ($c$)
Frequency of the carrier ($t_0$)
Number of pictures per second ($N$)

The liquid must satisfy the following equations:

$$\frac{k}{1+\alpha}=q_e N \text{ and } \frac{\alpha}{h}=q_m \frac{c}{t_0} \cdot N$$

wherein the constants must lie within the following limits $$4.10^{-14} \leq q_e \leq 3.10^{-12}$$
$$0.3 \leq q_m \leq 16$$

the constant $q_e$ possessing the dimension of a conductivity.

A satisfactory television picture, and thus an accurately controllable and determinable regulation of a light stream, can only take place when the liquid satisfies these conditions. The final product of continued distillation of mineral oil has a vapour pressure which is so low that it can be used in a high vacuum. For example, such an oil has already been marketed for many years under the name "Apiezonol" (Apiezon Oil).

This oil is reasonably viscous but the viscosity is only suitable for the purpose of the present invention if it is suitably cooled. However, by addition of Canada balsam the viscosity can easily be brought to the desired value, this method of increasing the viscosity of an oil by addition of Canada balsam being known in the art. Such a mixture still possesses insufficient electrical conductivity, but it is a familiar fact in the art that insulating liquids may be rendered conducting to any desired degree by the addition and mixing of conducting liquids. In the present case the added liquid must obviously also have a low vapour pressure and, by suitable vapour pressure measurements on known, conducting liquids, a suitable liquid can easily be found. A chemical substance suitable for this is, for example, tributyrin.

Having now particularly described and ascertained the nature of my said invention and in what manner the same is to be performed, I declare that what I claim is:

1. In a system for modulating a light beam in response to modulations of a sweeping beam of electrons, said modulations corresponding with N discrete television pictures per second, superposed on a carrier wave of frequency to, wherein is provided a source of said light beam, a screen, devices for projecting said light beam upon said screen, and an opaque device intermediate said source of said light beam and said screen for intercepting said light beam, the combination of a light modulating device interposed between said source of said light beam and said opaque device, said light modulating device comprising means for generating said beam of electrons, said light modulating device further comprising an extended translucent support and a translucent liquid medium disposed as a thin layer over said support, means for projecting said electron beam against said translucent liquid medium, said liquid medium being deformable in response to impact by said electron beam to provide temporary light diffraction elements for diffracting said beam of light sufficiently to pass light beyond said opaque device, said liquid medium possessing physical properties satisfying the equations:

(1) $$\frac{K}{14\delta}=q_e \cdot N$$

(2) $$\frac{\alpha}{k}=q_m \cdot \frac{c}{t_0} \cdot N$$

where K is electrical conductivity, $\delta$ is dielectric constant, $k$ is viscosity, $\alpha$ is capillarity constant, and $c$ is recording speed of the electron beam, and wherein $$4 \times 15^{-14} \leq q_e \leq 3 \times 10^{-12}$$
$$0.3 \leq q_m \leq 16$$

$q_e$ and $q_m$ being constants, said liquid medium comprising essentially the final product of the continued distillation of mineral oil, admixed with a viscosity increasing agent and with an electrical conductivity increasing agent in sufficient quantities to provide the physical characteristics required by said equations, while maintaining a vapor pressure in said liquid medium sufficiently low to enable use in high vacuum.

2. A light modulating cell comprising means for generating a beam of electrons modulated in response to a carrier of frequency to modulated by picture signal having a picture repetition rate of N pictures per second, a support, a liquid medium disposed as a thin layer over said support, and means for projecting said beam of electrons against said liquid medium and sweeping said beam of electrons across said liquid medium at a rate c, wherein said liquid medium possesses physical properties satisfying the equations:

(1) $$\frac{K}{14\delta}=q_e \cdot N$$

(2) $$\frac{\alpha}{k}=q_m \cdot \frac{c}{t_0} \cdot N$$

where K is electrical conductivity, $\delta$ is dielectric constant, $k$ is viscosity, $\alpha$ is capillarity constant, and $c$ is recording speed of the slectron beam, and wherein $$4 \times 10^{-14} \leq q_e \leq 3 \times 10^{-12}$$
$$0.3 \leq q_m \leq 16$$

$q_c$ and $q_m$ being constants, said liquid medium comprising essentially the final product of the continued distillation of mineral oil, admixed with a viscosity increasing agent and with an electrical conductivity increasing agent in sufficient quantities to provide the physical characteristics required by said equations, while maintaining a vapor pressure in said liquid medium sufficiently low to enable use in high vacuum.

ERNST FRIEDRICH FISCHER.

REFERENCES CITED

The following references are of record in the file of this patent:

UNITED STATES PATENTS

| Number | Name | Date |
|---|---|---|
| 2,391,451 | Fischer | Dec. 25, 1945 |